Jan. 4, 1966    E. S. BABSON    3,227,098
CONVEYOR CONTROL DEVICES
Filed Oct. 7, 1963    6 Sheets-Sheet 1

Inventor
Edward S. Babson
By his Attorney
Robert E. Ross

Jan. 4, 1966   E. S. BABSON   3,227,098
CONVEYOR CONTROL DEVICES
Filed Oct. 7, 1963   6 Sheets-Sheet 3

Jan. 4, 1966

E. S. BABSON 3,227,098

CONVEYOR CONTROL DEVICES

Filed Oct. 7, 1963

Jan. 4, 1966  E. S. BABSON  3,227,098
CONVEYOR CONTROL DEVICES
Filed Oct. 7, 1963  6 Sheets-Sheet 5

United States Patent Office 3,227,098
Patented Jan. 4, 1966

3,227,098
CONVEYOR CONTROL DEVICES
Edward S. Babson, Ipswich, Mass., assignor to United Shoe Machinery Corporation, Boston, Mass., a corporation of New Jersey
Filed Oct. 7, 1963, Ser. No. 314,149
4 Claims. (Cl. 104—172)

This invention relates generally to conveyors, and has particular reference to a conveyor designed for use in the manufacture of shoes, and to means for controlling the operation thereof.

In United States Letters Patent No. 3,130,685, granted April 28, 1964, in the names of Sidney G. Goodrich et al., there is disclosed a conveyor system comprising a floor-mounted tow chain which is adapted to tow shoe racks from a pool position to various work stations. Means is also provided on the conveyor for releasing racks individually from the pool position, and separate means is provided at each work station for arresting a rack released from the pool position. In United States Letters Patent No. 3,158,105, granted November 24, 1964, in the names of J. Robbins et al., there is disclosed a novel form of rack stop mechanism which is particularly adapted for use with a conveyor of the type disclosed in the above-identified Patent No. 3,130,685.

In United States Letters Patent No. 3,148,634, granted September 15, 1964, in the name of Sidney G. Goodrich, there is disclosed a novel form of towing arm for use with racks of the type described in the above-identified application.

As illustrated in the above-identified patents, the conveyor comprises a chain having two parallel runs which travel in opposite directions, and are spaced apart far enough to permit the installation of stop mechanisms between the runs. During operation, racks are released from a pool stop mechanism to travel in one direction between work stations disposed on one side of the conveyor chain and travel in the opposite direction between work stations on the opposite side of the conveyor chain.

When a rack arrives at the end of the first run, it has heretofore been necessary to remove it manually from operative relation to the chain, push it around the end of the conveyor and re-engage it with the chain. Such procedure requires that either an extra operator be stationed at the end of the conveyor, or that the operator of the machine at the end of the first run be assigned to move the racks around to the other side of the conveyor.

In another application Serial No. 280,237, filed May 14, 1963 by Robert J. Bernard, now United States Letters Patent No. 3,175,516, granted March 30, 1965, there is disclosed a novel mechanism for disengaging a rack from a first run of the conveyor chain, transferring it around the end of the conveyor, and causing it to become re-engaged with the chain on a second run of the conveyor.

The operation of this latter portion of the conveyor system has been found to be generally satisfactory except on occasions when a rack entering the take-around mechanism is closely followed by a second rack. Since the speed of the take-around is less than the speed of the conveyor chain, the following rack can collide with the leading rack after the leading rack has started around the end of the conveyor and while it is angularly disposed in relation to the following rack. A collision under such conditions can cause inadvertent interlocking of the colliding portions, resulting in damage to the racks.

The object of this invention is to provide a conveyor system of the type described in which means is provided for controlling the movement of racks in the conveyor system.

A further object of the invention is to provide a rack stop mechanism for use with a conveyor system of the type described, having means to enable a rack released from the stop mechanism to automatically return said stop mechanism to the stop position.

A further object of the invention is to provide a control system for use with a conveyor system of the type described in which the discharge of a rack from the take-around mechanism actuates means for releasing a rack for entrance into the take-around mechanism.

Other objects of the invention will be apparent to one skilled in the art from the following detailed description of a specific embodiment thereof.

Figure 1:
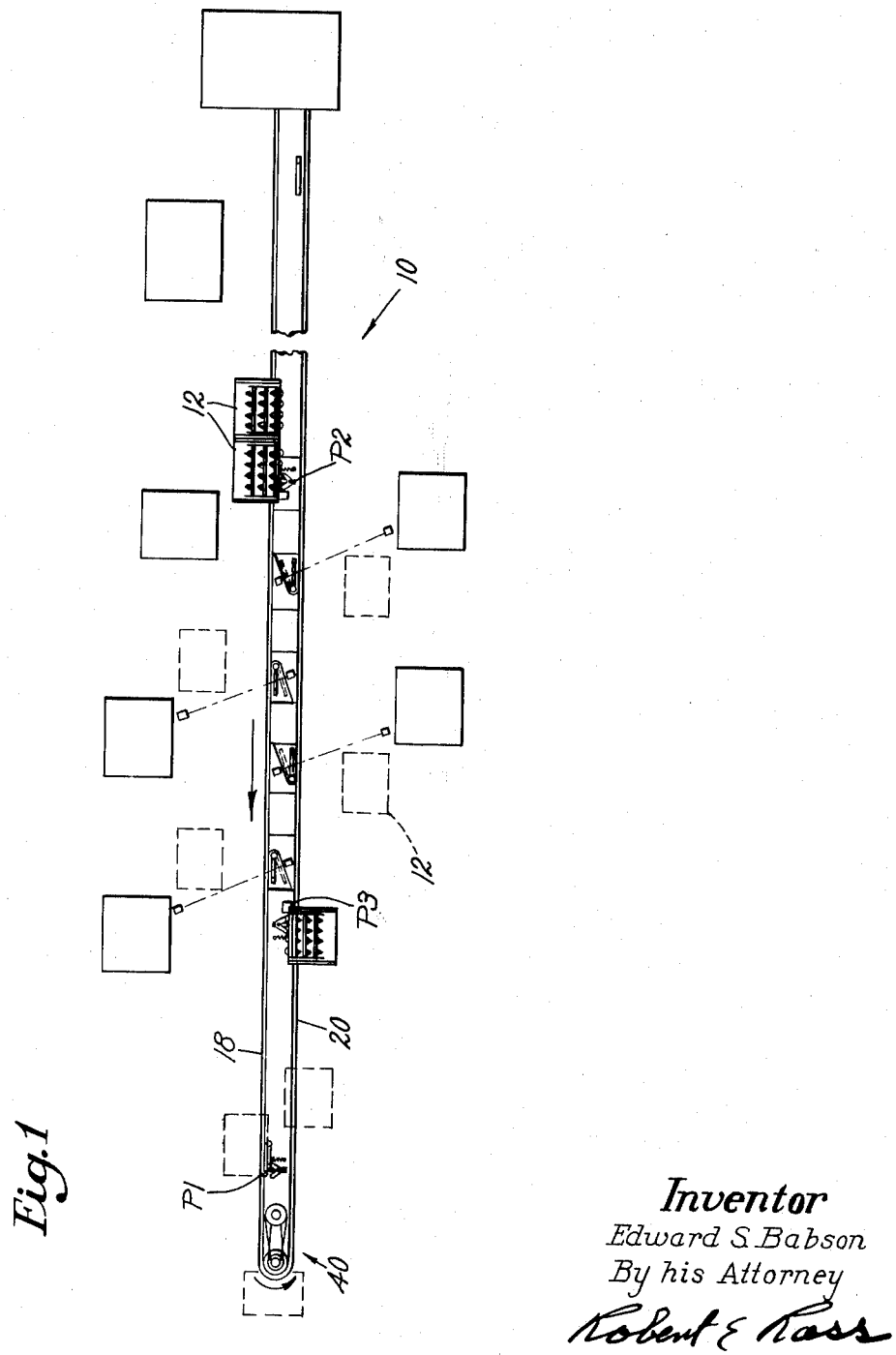
FIG. 1 is a schematic plan view of a conveyor system embodying the features of the invention.

Referring to the drawings, there is illustrated a conveyor system 10 of the type which is adapted to move article carrying devices such as shoe racks 12 or the like between work stations.

The conveyor comprises a continuous chain 14 driven by suitable means (not shown) at one end, said chain traveling around a suitable sprocket wheel 16 at the other end, forming two spaced runs 18 and 20 traveling in opposite directions. As described in the above-identified patents, various types of rack arresting mechanisms may be disposed between the runs.

Figure 4:
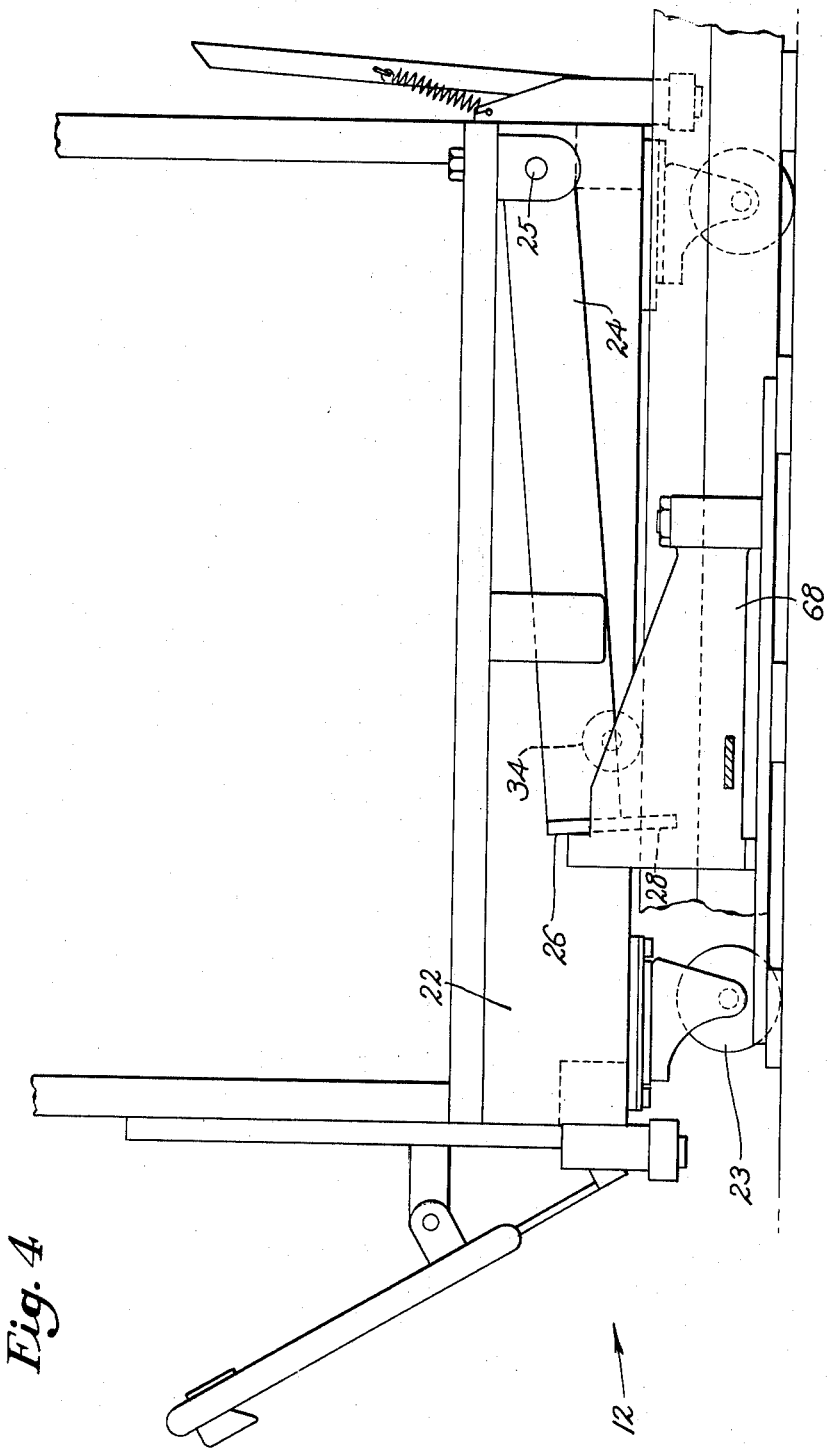
FIG. 4 is a view in section taken on line IV—IV of FIG. 3.

The rack 12 for use with the conveyor system includes a base 22 supported by suitable casters 23 (FIG. 4) and is adapted to be towed by the conveyor chain by means of a towing arm 24 which is pivoted to the base at 25 and extends forwardly therefrom, and has a latch plate 26 disposed on the end thereof.

The plate 26 has a depending portion 28 for engagement with towing blocks 30 (FIGS. 3 and 7) in the chain, and a laterally extending portion 32 for engagement with suitably positioned arresting mechanisms. To maintain the depending portion 28 in a predetermined heightwise relation to the chain, a roller 34 is provided on the towing arm for riding on the top of a towing arm support rail 36 disposed alongside the chain.

In the illustrated embodiment, work stations are positioned along both sides of the conveyor runs, with the racks traveling between work stations in the direction indicated by the arrows (see FIG. 1). To provide means for automatically moving a rack around the end of the conveyor from outgoing run 18 to return run 20, a mechanism 40 now to be described is provided at the end opposite the driving mechanism.

The mechanism 40 is operated by the conveyor sprocket wheel 16 and comprises a second sprocket wheel 42 rotatably mounted on the shaft 44 of the conveyor sprocket wheel 16 and secured to the hub of the wheel 16. A rack driving sprocket wheel 46 is also mounted on the shaft 44 and rotatable on the hub of the sprocket wheel 16, and a pair of speed reducing sprocket wheels 48 and 50 are mounted on a shaft 52 spaced from the shaft 44.

The sprocket wheel 16, driven by the conveyor chain, drives the sprocket wheel 42 which in turn drives, by means of a first drive chain 54, the upper sprocket wheel 50 on the shaft 52. The lower sprocket wheel 48, driven by the shaft 52 drives, through a second drive chain 56, the rack driving sprocket wheel 46. The ratio of size of the sprocket wheels is such that the speed of rotation of the rack driving wheel 46 is about 1/5 of the speed of the rotation of the conveyor sprocket 16.

Disposed around the conveyor chain sprocket 16 is a guide rail 58 having portions 60 and 62 adjacent the ends of the towing arm support rails 36 which are the same height as said rails, and having a medial portion 64 which is higher than the portions 60 and 62 for a purpose to appear hereinafter.

To engage the latch plate of a rack and move the rack around the end of the conveyor, the sprocket wheel 46 is provided with a tongue 66 which projects beyond the periphery of the conveyor sprocket 16 and is positioned heightwise so as to engage the latch plate 26 of a rack in a manner now to be described. As a rack 12 is conveyed by the chain 14 toward the mechanism 40, with the roller 34 of the towing arm riding on the support rail 36 and the depending portion 28 of the latch plate engaged by a towing block 30, the roller 34 passes over the end portion 60 of the guide rail 58 and up onto the medial portion 64. The latch plate is thereby lifted out of engagement with the towing block 30, and the rack stops with the roller 34 resting on the elevated medial portion, with the latch plate approximately in the position shown in FIGS. 2 and 5.

Figure 2:
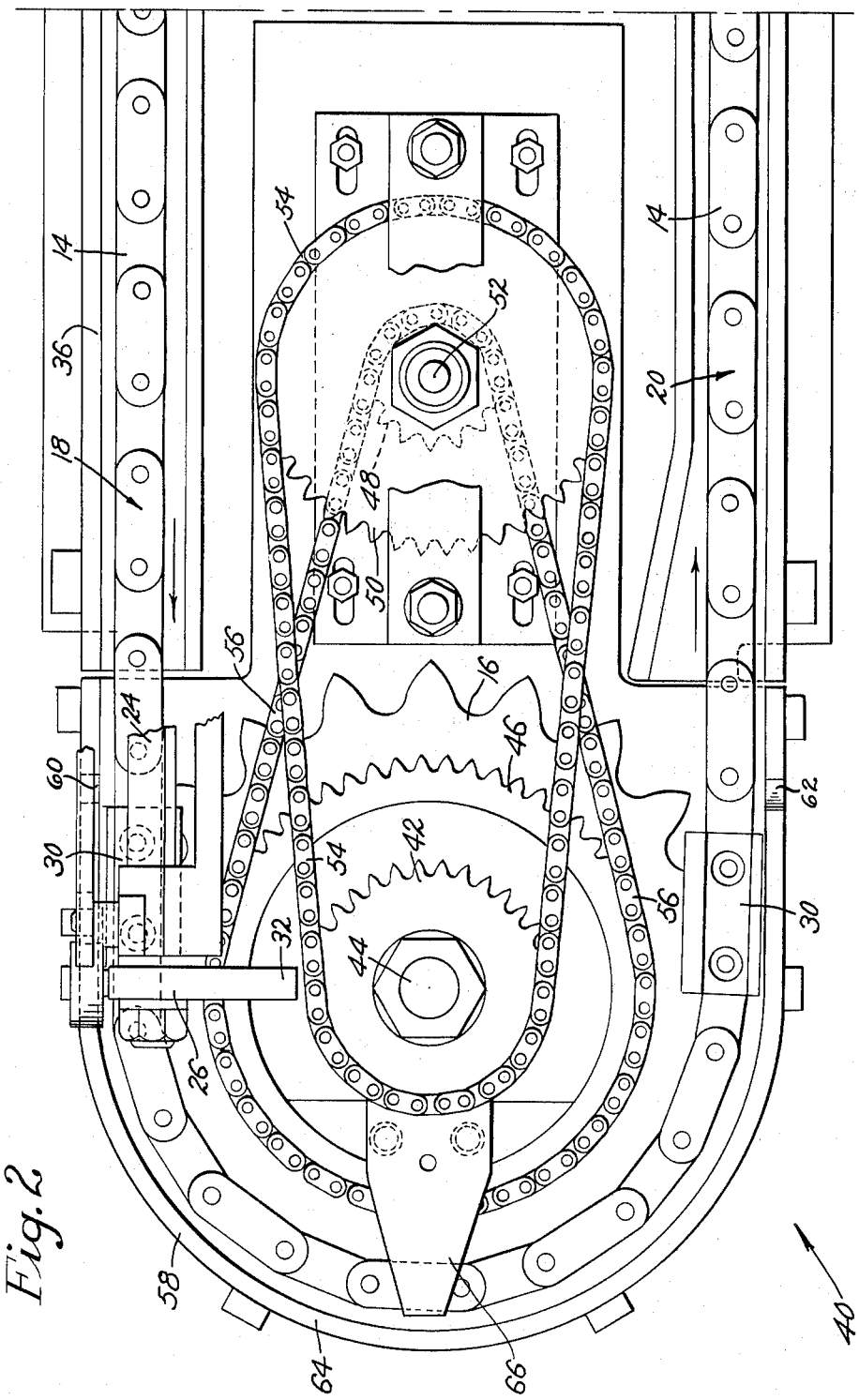
FIG. 2 is a top plan view on a larger scale of an end of the conveyor of FIG. 1 illustrating the transfer mechanism for moving a rack around the end of the conveyor.

Thereafter, as the sprocket 46 rotates (counterclockwise as seen in FIG. 2), the tongue 66 engages the rear side of the latch plate and thereby forces the rack to travel around the end of the conveyor with the rack being guided by the engagement of the latch plate with the guide rail 58. When the tongue 66 has rotated through just over 180°, the roller 34 passes from the medial portion 64 down onto the end portion 62 of the guide rail (see FIG. 7) so that the latch plate is lowered into operative relation to the conveyor chain to be engaged by the next towing block 30, to be conveyed toward the next work station.

In the illustrated embodiment of the invention pool stops P1 and P2, similar to the type described in the above-identified applications, are provided at the beginning and at the end of the run 18 of the conveyor. A third pool stop P3 may be provided in the run 20 just downstream of the transfer mechanism.

Figure 3:
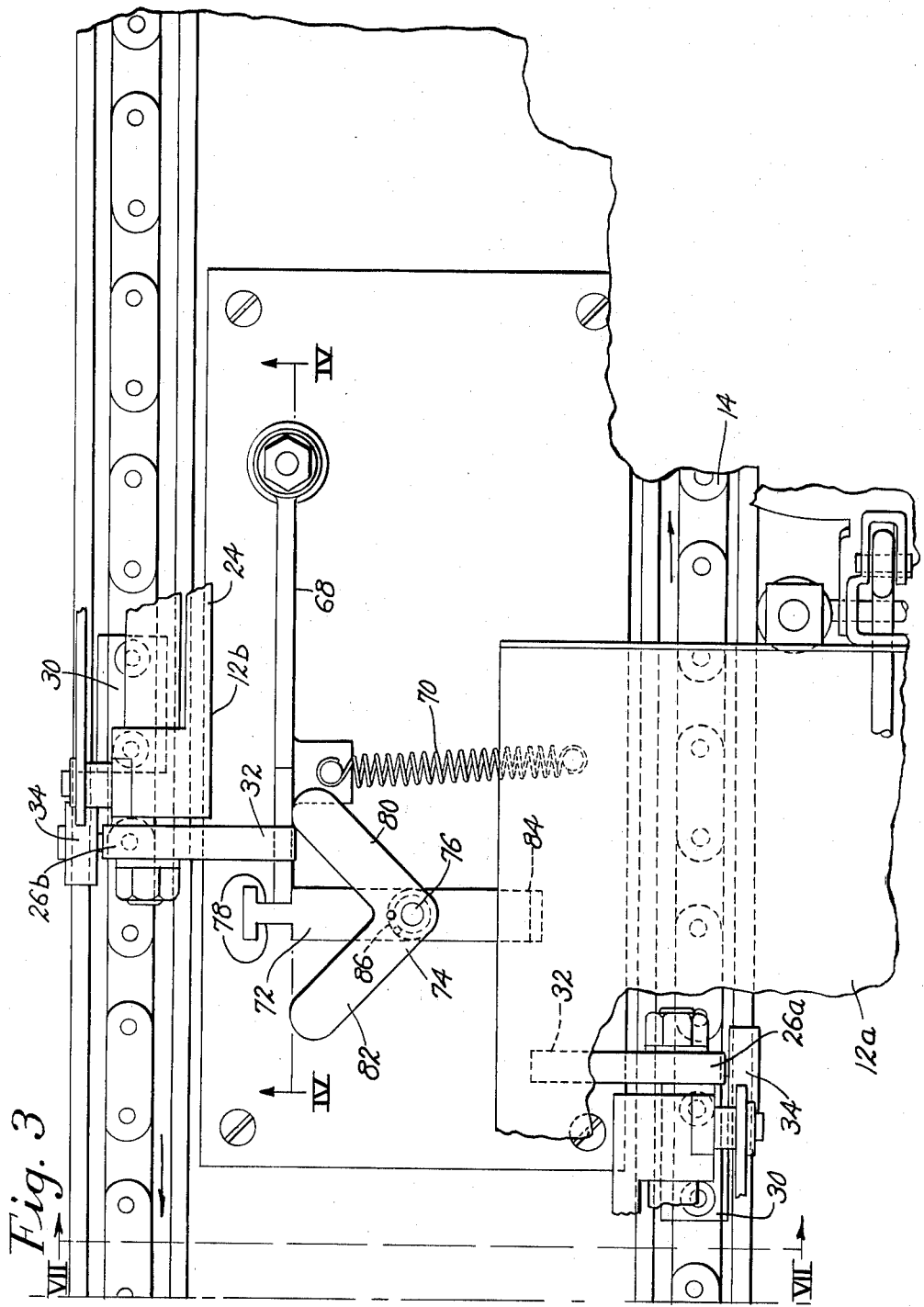
FIG. 3 is a top plan view of a portion of the conveyor adjacent the transfer mechanism, and is an extension of the right hand end of FIG. 2 illustrating one form of a mechanism for controlling the entrance of racks into the transfer mechanism.

The pool stop P1 comprises a stop arm 68 (FIGS. 5–7) movable between a pass position in which the arm 68 is inclined away from the conveyor chain, and a stop position in which the arm 68 is disposed in generally parallel relation to the chain in position to cam the latch plate of a rack up out of engagement with the chain (see FIG. 3).

The position of the arm 68 is controlled by a spring 70, a latch lever 72, and a control arm 74 in a manner to be described. The lever 72 and the control arm 74 are mounted on the upper end of a support post 76 so as to be pivotal thereon. The arm 68 is biased by the spring 70 to the pass position but is maintained in the stop position during most of the operating cycle by the lever 72 which is provided with a suitable recess 78 to receive the end of the arm 68.

The control arm 74 comprises a pair of diverging portions 80 and 82, the portion 80 extending generally rearwardly in relation to the direction of rack travel and the portion 82 extending generally forwardly, both portions also being inclined toward the outgoing run 18 of the conveyor chain. The portions 80 and 82 are also offset from each other in a vertical direction (FIG. 7), with the portion 82 being disposed at a higher level than the portion 80 for a purpose to appear hereinafter.

Figure 5:
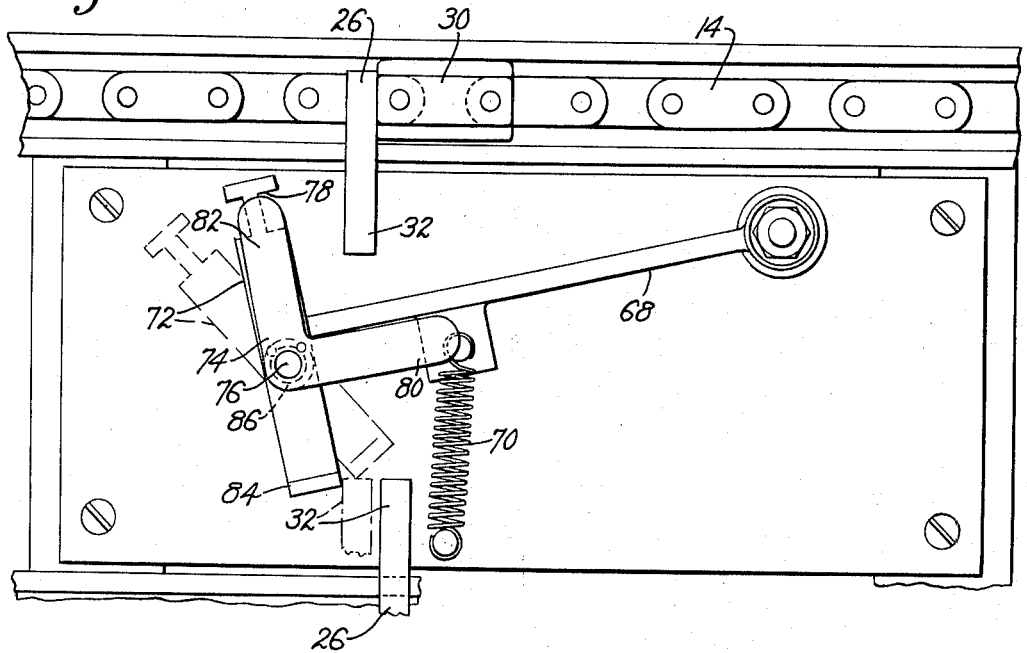
FIG. 5 is a plan view of the control mechanism of FIG. 3 illustrating the operation thereof in opening the pool position stop member in response to actuation by a rack released from the transfer mechanism.
Figure 6:
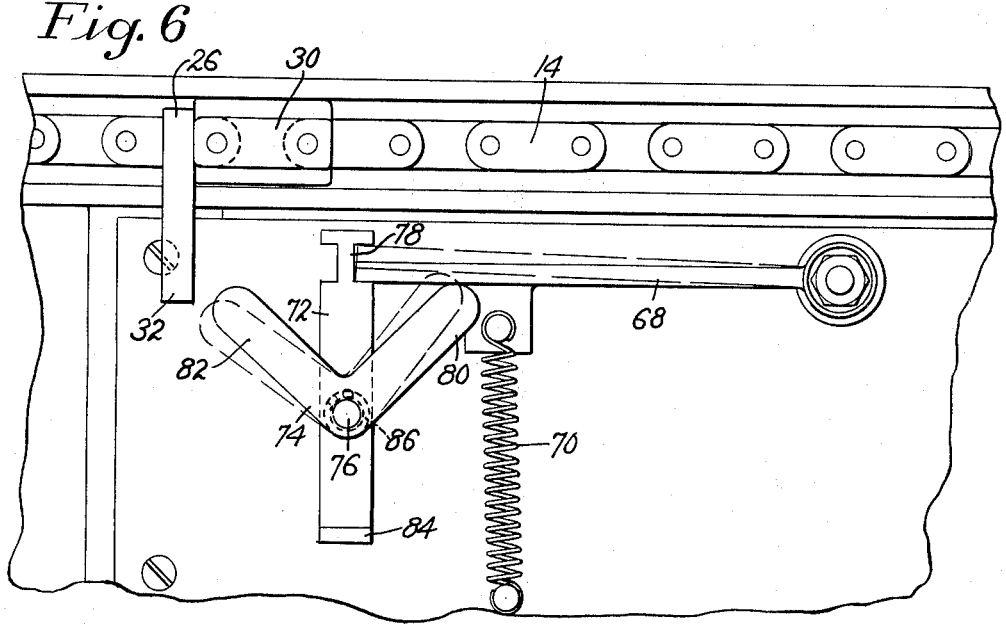
FIG. 6 is a view similar to FIG. 5 illustrating the operation of the control mechanism in returning the pool stop to the stop position in response to actuation by the rack released from the pool stop.
Figure 7:
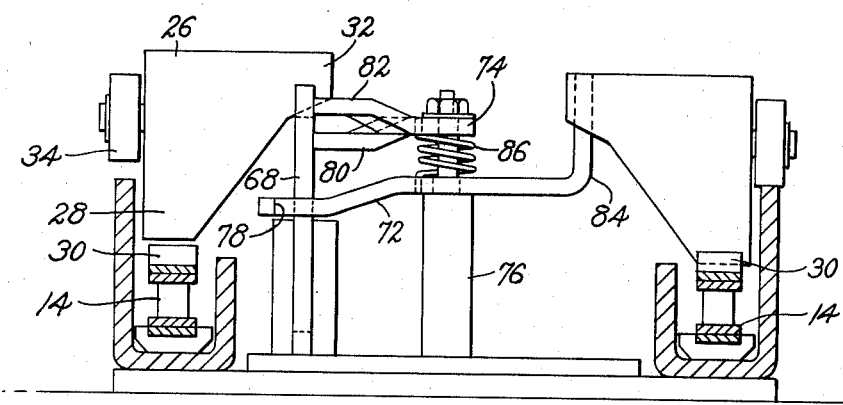
FIG. 7 is a view in section taken on line VII—VII of FIG. 3.

The lever 72 has an operating portion 84 which extends toward the incoming run 20 of the chain, the end thereof being turned upwardly into position for engagement by a latch plate 26 of a rack traveling on the incoming run of the conveyor (see FIGS. 5 and 7).

Disposed on the post 76 between the lever 72 and the control arm 74 and connected to both is a torsion spring 86 which is preloaded to bias the lever 72 in a clockwise direction (as seen in FIG. 3) against the end of the stop arm 68, and to bias the control arm 74 in a counterclockwise direction so that the end of the portion 80 thereof bears against the side of the stop arm 68.

During operation of the conveyor, the control device associated with the pool stop P1 prevents the release of a rack from the pool stop into the transfer mechanism until a rack already in the transfer mechanism has been discharged therefrom in a manner to be described.

Assuming that the device is in the condition shown in FIG. 3, with a first rack 12a having just left the transfer mechanism and traveling on the incoming run 20, but not yet having reached the control mechanism, the stop arm 68 is maintained in the stop position by the lever 72 against the action of the spring 70 to retain the second rack 12b at the pool stop.

When the latch plate 26a of the first rack reaches the operating end 84 of the lever 72, the lever is pivoted counterclockwise to disengage the stop arm 68 from the recess 78, so that the arm is pulled by the spring 70 away from the conveyor chain to the pass position.

The latch plate 26b of the second rack 12b thereby drops into position for engagement with a towing block 30 on the conveyor chain, so that the rack is moved toward the transfer mechanism (see FIG. 5). As the rack moves away from the control mechanism, the latch plate engages the portion 82 of the control arm and rotates the control arm counterclockwise, so that the portion 80 of the control arm moves the stop arm 68 back to the stop position. As the stop arm reaches the stop position, the end thereof again seats in the recess 78 of the lever 72 so that any rack following the second rack 12b will be held at the pool stop until the second rack has been discharged from the transfer mechanism and has actuated the lever 72 in the manner previously described. The fact that the portion 80 of the control arm is lower than the portion 82 enables the latch plate 26 of a rack approaching the pool stop P1 to engage the stop arm 68 without contact with the first portion 80 of the control arm, yet can actuate the control arm in the manner previously described by contact with the second portion 82 when the latch plate is reengaged with the chain.

The control mechanism may also be utilized, with modifications now to be described, for controlling the operation of the upstream pool stop P2.

Figure 8:
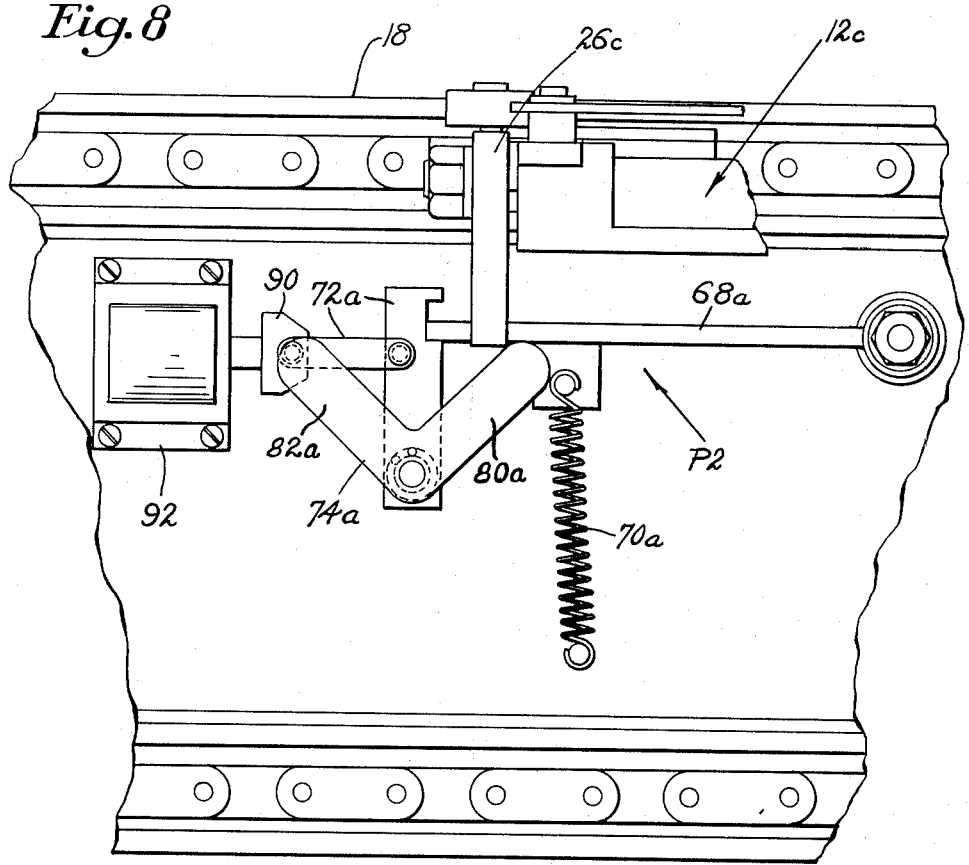
FIG. 8 is a top plan view of another form of the mechanism illustrating its use as a pool stop control.

Referring to FIG. 8, there is illustrated a top plan view of pool stop P2 which is similar to pool stop P1 in having a stop arm 68a controlled by a spring 70a, a latch lever 72a and a control arm 74a mounted on a support post 76, with the control arm having portions 80a and 82a for the purpose previously described. Secured to the latch lever 72 is the armature 90 of a solenoid 92 which, in the illustrated embodiment, is normally de-energized.

When an operator at a work station downstream from the pool stop P1 needs a rack of work, he may energize solenoid 92 momentarily by means not shown, whereby the armature 90 pulls the latch lever away from the end of the stop arm 68a, allowing the stop arm to swing away from the conveyor chain to the pass position. The latch plate 26c of the rack held at the pool stop thereby drops into engagement with the chain, and the rack moves away from the pool stop. As the latch plate 26c passes the portion 82a of the control arm 74a, it actuates said arm to move the stop arm back to the stop position, where it is retained by the latch arm 72a, in the manner previously described in connection with pool stop P1.

Since certain obvious changes may be made in the device without departing from the scope of the invention it is intended that all matter contained herein be interpreted in an illustrative and not in a limiting sense.

Having thus described my invention, what I claim as new and desire to secure by Letters Patent of the United States is:

1. A conveyor system for transferring article carrying devices between work stations, comprising a first run for conveying devices in one direction and a second run parallel to the first run for conveying articles in the opposite direction, a stop mechanism associated with the first run, said mechanism comprising a stop arm movable between a stop position in which position articles traveling on the first run are arrested and a pass position in which articles traveling on the first run are not arrested, and a stop member control mechanism disposed between the runs, said control mechanism comprising a latch means for maintaining said stop arm in the stop position, first lever means for releasing said latch means, said lever means having a portion positioned in relation to the second run so as to be actuated by an article carrying device traveling on the second run to release said latch means to permit an article carrying device to be released from said stop mechanism, and second lever means actuatable by the passage of said released rack from the stop mechanism to move said stop arm back to the stop position into engagement with said latch means.

2. A stop mechanism for use with a conveyor system of the type described, comprising arresting means for arresting an article carrying device, said means being movable between an arresting and a non-arresting position, means biasing said arresting means to the non-arresting position, latch means for retaining said arresting means in the arresting position, means for momentarily releasing said latch means to permit said arresting means to move to the non-arresting position to release an article carrying device to permit it to be moved away from the stop mechanism and means responsive to the movement of the article carrying device away from the stop mechanism to move said arresting means back into engagement with said latch means.

3. A stop mechanism as set out in claim 2 in which the means for moving the stop mechanism back into engagement with said latch means comprises a pivoted arm having a first portion positioned for engagement by the article carrying device upon release from the arresting means and a second portion operable by said engagement of the article carrying device with the first portion to return said arresting means to the arresting position.

4. A conveyor system for transferring article carrying devices between work stations, comprising first and second parallel conveyor runs, rotating means at adjacent ends of said runs adapted to receive article carrying devices from the end of the first run and transfer it to the adjacent end of the second run, said first run having means conveying article carrying devices toward said rotating means, said second run having means conveying article carrying devices away from said rotating means, stop means associated with said first run movable between a stop position in which an article-carrying device approaching said rotating means is arrested and a pass position in which said article carrying means is not arrested, means responsive to the passage of an article carrying device beyond said stop member to cause said stop member to move to the stop position, and means responsive to the passage of the same article carrying device past a predetermined point at the beginning of the second run to return said stop member to the pass position.

References Cited by the Examiner
UNITED STATES PATENTS

| | | | |
|---|---|---|---|
| 1,509,374 | 9/1924 | Nolan | 104—253 X |
| 2,845,034 | 7/1958 | Harrison | 104—96 |
| 2,949,862 | 8/1960 | Klamp | 104—88 |
| 2,982,227 | 3/1961 | Bishop et al. | 104—96 |
| 3,024,741 | 3/1962 | Klamp | 104—172 |
| 3,099,966 | 8/1963 | Bishop et al. | 104—96 |
| 3,130,685 | 4/1964 | Goodrich et al. | 104—172 |

ARTHUR L. LA POINT, *Primary Examiner.*

LEO QUACKENBUSH, *Examiner.*